United States Patent
Chen

(10) Patent No.: US 8,825,271 B2
(45) Date of Patent: Sep. 2, 2014

(54) SMART PHONE APP-BASED VIN DECODING AND SYMPTOMATIC DIAGNOSTIC SYSTEM AND METHOD

(71) Applicant: Innova Electronics, Inc., Irvine, CA (US)

(72) Inventor: Ieon C. Chen, Laguna Hills, CA (US)

(73) Assignee: Innova Electronics, Inc., Irvine, CA (US)

( * ) Notice: Subject to any disclaimer, the term of this patent is extended or adjusted under 35 U.S.C. 154(b) by 107 days.

(21) Appl. No.: 13/734,254

(22) Filed: Jan. 4, 2013

(65) Prior Publication Data

US 2014/0195099 A1  Jul. 10, 2014

(51) Int. Cl.
| | | |
|---|---|---|
| *G06F 17/30* | (2006.01) | |
| *G01M 17/00* | (2006.01) | |
| *G06F 17/00* | (2006.01) | |
| *G07C 5/08* | (2006.01) | |
| *G07C 5/00* | (2006.01) | |
| *H04L 29/08* | (2006.01) | |
| *G05B 23/02* | (2006.01) | |
| *H04W 88/02* | (2009.01) | |
| *H04B 1/08* | (2006.01) | |

(52) U.S. Cl.
CPC .............. *G06F 17/00* (2013.01); *G07C 5/0808* (2013.01); *G07C 5/008* (2013.01); *G07C 2205/02* (2013.01); *G07C 5/006* (2013.01); *G07C 5/0841* (2013.01); *H04W 88/02* (2013.01); *H04L 67/04* (2013.01); *H04B 1/082* (2013.01); *G05B 23/0278* (2013.01); *G05B 23/0272* (2013.01); *G06F 17/30398* (2013.01); *G06F 17/30401* (2013.01); *G06F 17/30395* (2013.01); *G06F 17/30507* (2013.01); *G06F 17/30522* (2013.01); *G06F 17/30554* (2013.01)

USPC ........................................................ 701/29.6

(58) Field of Classification Search
CPC .............. G06Q 30/06; G06Q 30/0623; G07C 2205/02; G07C 5/008; G07C 5/0808; G07C 5/006; G07C 5/0841; H04B 1/082; H04B 1/3822; H04W 88/02; H04L 67/24; A61B 5/0002; G05B 23/00; G05B 23/0259; G05B 23/0267; G05B 23/0272; G05B 23/0275; G05B 23/0278; G06F 17/30395; G06F 17/30401; G06F 17/30398; G06F 17/30507; G06F 17/30554; G06F 17/30522
USPC ................................... 701/29.6, 29.1; 381/6
See application file for complete search history.

(56) References Cited

U.S. PATENT DOCUMENTS

| | | | | |
|---|---|---|---|---|
| 5,020,135 | A | * | 5/1991 | Kasparian et al. .............. 455/76 |
| D334,560 | S | | 4/1993 | Wilson |

(Continued)

OTHER PUBLICATIONS

SPX Corporation, Genisys Evo catalog, 2011, 8 pages.

*Primary Examiner* — Russell Frejd
(74) *Attorney, Agent, or Firm* — Stetina Brunda Garred & Brucker

(57) ABSTRACT

A system and method of diagnosing a vehicle using a smart phone to collect symptomatic data from the user/driver. The symptomatic data is received by the user in response to symptomatic questions displayed on the user's smart phone. The symptomatic questions are generated in response to deriving vehicle characteristic information (i.e., year, make, model, engine) from vehicle identification information (i.e., the vehicle identification number (VIN) or license plate information). In this regard, vehicle-specific symptomatic questions may be presented to the user so as to ask pertinent questions based on a history of diagnoses of vehicles sharing similar vehicle characteristics.

45 Claims, 3 Drawing Sheets

(56) References Cited

U.S. PATENT DOCUMENTS

| | | |
|---|---|---|
| 5,347,211 A | 9/1994 | Jakubowski |
| D377,622 S | 1/1997 | Chen |
| 5,635,841 A | 6/1997 | Taylor |
| 5,767,681 A | 6/1998 | Huang |
| 5,794,164 A * | 8/1998 | Beckert et al. ............... 455/3.06 |
| 6,000,413 A | 12/1999 | Chen |
| 6,499,385 B2 | 12/2002 | Protti |
| 6,738,697 B2 * | 5/2004 | Breed ........................... 701/31.5 |
| 6,768,935 B1 * | 7/2004 | Morgan et al. ............... 701/29.6 |
| 6,868,369 B2 | 3/2005 | Huang |
| 6,940,270 B2 | 9/2005 | Chen |
| D510,287 S | 10/2005 | Chen |
| 6,968,733 B2 | 11/2005 | Andreasen |
| 7,030,742 B2 | 4/2006 | Treadway |
| 7,085,680 B2 | 8/2006 | Huang |
| 7,089,099 B2 * | 8/2006 | Shostak et al. ............... 701/29.6 |
| 7,103,460 B1 * | 9/2006 | Breed ........................... 701/32.9 |
| 7,116,216 B2 | 10/2006 | Andreasen |
| 7,209,813 B2 | 4/2007 | Namaky |
| RE39,619 E | 5/2007 | Andreasen |
| D545,223 S | 6/2007 | Chen |
| D558,621 S | 1/2008 | Rich |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| D569,280 S | 5/2008 | Chen |
| 7,376,497 B2 | 5/2008 | Chen |
| D571,241 S | 6/2008 | Andreasen |
| 7,409,317 B2 * | 8/2008 | Cousin et al. ................. 702/183 |
| 7,421,321 B2 * | 9/2008 | Breed et al. ................. 701/33.6 |
| 7,437,227 B2 | 10/2008 | Andreasen |
| D581,822 S | 12/2008 | Madison |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,584,074 B2 * | 9/2009 | Cousin et al. ................. 702/183 |
| 7,603,293 B2 | 10/2009 | Chen |
| 7,620,484 B1 * | 11/2009 | Chen ........................... 701/31.5 |
| D610,586 S | 2/2010 | Chen |
| 7,698,104 B2 * | 4/2010 | Cousin et al. ................. 702/183 |
| 7,734,390 B2 | 6/2010 | Chen |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 7,974,750 B2 * | 7/2011 | Namaky ...................... 701/33.2 |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,419 B2 | 10/2011 | Chen |
| 8,068,951 B2 | 11/2011 | Chen et al. |
| 8,131,417 B2 * | 3/2012 | Picard ........................... 701/31.4 |
| 8,301,329 B2 | 10/2012 | Andreasen |
| 8,306,687 B2 | 11/2012 | Chen |
| 8,370,018 B2 | 2/2013 | Andreasen et al. |
| 8,548,674 B2 * | 10/2013 | Namaky ...................... 701/32.8 |
| 2002/0007237 A1 | 1/2002 | Phung et al. |
| 2004/0227523 A1 | 11/2004 | Namaky |
| 2005/0192727 A1 * | 9/2005 | Shostak et al. ................. 701/37 |
| 2008/0119981 A1 | 5/2008 | Chen |
| 2009/0276115 A1 * | 11/2009 | Chen ............................... 701/32 |
| 2011/0071720 A1 * | 3/2011 | Schondorf et al. ............. 701/30 |
| 2011/0123039 A1 * | 5/2011 | Hirschfeld et al. ............. 381/86 |
| 2011/0224866 A1 | 9/2011 | Chen |
| 2011/0264322 A1 | 10/2011 | Chen |
| 2012/0010775 A1 | 1/2012 | Chen |
| 2012/0130844 A1 * | 5/2012 | Picard ........................... 705/26.4 |
| 2012/0215398 A1 | 8/2012 | Chen |

* cited by examiner

SMART PHONE APP-BASED VIN DECODING AND SYMPTOMATIC DIAGNOSTIC SYSTEM AND METHOD

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Technical Field of the Invention

The present invention relates to a smart phone application, and more specifically, a smart phone application for facilitating vehicle-specific symptomatic diagnosis of a vehicle.

2. Description of the Related Art

Automobiles are a common means of transportation in regions throughout the world. In this regard, automobiles may be used for local, day-to-day transportation, or for traveling to more far-reaching destinations.

Automobiles are sophisticated machines comprised of cooperative electrical, mechanical and fluid components. Although automobiles are designed to operate for long periods of time between routine maintenance and checkup, breakdowns may occur at any moment. For those drivers using their automobile for local transportation, a breakdown may be quickly remedied by visiting a local mechanic or repair shop. However, if an automobile breaks down while in a remote location, it may be more difficult to resolve the problem.

For instance, the driver may be required to call an unknown tow-service to have the automobile to a nearby repair shop. Once at the repair shop, the driver is oftentimes in a vulnerable position since the driver cannot diagnose the automobile problem by himself and thus, must rely on the opinion of the mechanic. The mechanic may be misleading as to the true nature of the problem, as well as the cost associated with fixing the problem.

Various devices have been developed to arm the driver with objective diagnostic information regarding the health of their vehicle. For instance, diagnostic scan tools are devices which typically connect with an onboard vehicle computer to retrieve diagnostic trouble codes therefrom. The diagnostic trouble codes may be uploaded to a diagnostic database for analysis for determining a possible diagnostic solution.

Although such devices are typically powerful automotive diagnostic tools, drivers oftentimes do not have access to diagnostic equipment when a vehicle breaks down. For instance, one family may own one diagnostic scan tool for use with several vehicles, such that if any of the vehicles not including the diagnostic scan tool breaks down, the tool may not be available as a resource.

Recognizing this deficiency, there is a need in the art for a diagnostic system which utilizes equipment readily accessible to a driver, should a breakdown occur. One device commonly carried or kept in close proximity to many individuals is a smart phone, which is a handheld electronic device capable of communicating over a cellular telephone network. Smart phones are also typically include data processing and display capabilities, which allows smart phones to be used for a wide range of functions beyond simply making phone calls.

Therefore, there is a need in the art for an automotive diagnostic system which utilizes the capabilities smart phone to retrieve symptomatic information from a user/driver and upload such information to a diagnostic database. As described below, the present invention addresses these and other improvements to contemporary vehicle authentication and diagnostic prediction systems.

BRIEF SUMMARY OF THE INVENTION

There is provided a system and method of diagnosing a vehicle using a smart phone to collect symptomatic data from the user/driver. The symptomatic data is received by the user in response to symptomatic questions displayed on the user's smart phone. The symptomatic questions are generated in response to deriving vehicle characteristic information (i.e., year, make, model, engine) from vehicle identification information (i.e., the vehicle identification number (VIN) or license plate information). In this regard, vehicle-specific symptomatic questions may be presented to the user so as to retrieve pertinent information based on a history of diagnoses of vehicles sharing similar vehicle characteristics.

According to one embodiment, there is provided a system for providing vehicle specific diagnostics for a vehicle using a smart phone. The system includes a vehicle decoder disposable in communication with the smart phone and configured to determine vehicle characteristic information based on vehicle identification information received from the smart phone, wherein the vehicle characteristic information includes the vehicle year, make and model. The system further includes a diagnostic database having diagnostic solutions matched with symptomatic data, the diagnostic database being organized according to vehicle characteristic information. A computer readable medium is downloadable onto the smart phone for configuring the smart phone to display a symptomatic question sequence for the user, store symptomatic data received from the user, and communicate the symptomatic data to the diagnostic database. The diagnostic database is configured to match symptomatic data received from the smart phone with a diagnostic solution corresponding to the vehicle characteristic information of the vehicle.

The system may additionally include a smart phone. The vehicle decoder and/or the diagnostic database may be located on the smart phone. It is also contemplated that the vehicle decoder and/or the diagnostic database may be located remotely from the smart phone, such as on a remote server or personal computer.

The vehicle identification information may include the vehicle identification number or license plate information.

At least one of the vehicle decoder and the computer readable medium may be configured to extract the vehicle identification information from a photograph received from the smart phone.

The symptomatic question sequence may include a first question and a second question, wherein the content of the second question depends on user input received in relation to the first question.

The computer readable medium may further configure the smart phone to receive the diagnostic solution from the diagnostic database, and display the diagnostic solution. The information received and displayed may include possible solutions, repair procedures, costs of repair, local mechanics, etc.

The computer readable medium may further configure the smart phone to receive vehicle diagnostic data, and upload the vehicle diagnostic data to the diagnostic database. The diagnostic database may be configured to receive the diagnostic data and make a diagnostic determination based on the vehicle diagnostic data and the symptomatic data.

The system may further include a defect database having information related to defects that have occurred in different vehicles and the reference mileage at which such defects occurred. A defect predictor may be in communication with the vehicle decoder and the defect database and may be configured to identify defects listed in the defect database corresponding to vehicles having similar characteristic information to the vehicle. The defect database may include the reference mileage associated with each identified associated defect. The computer readable medium may further configure the smart phone to prompt the user to enter the mileage of the vehicle and communicate the entered mileage to the defect predictor. The defect predictor may be further configured to restrict the identified defects to defects that have occurred within a mileage bracket that substantially corresponds to the current mileage communicated in the first signal.

According to another aspect of the present invention, there is provided a computer readable medium downloadable onto a smart phone for providing vehicle specific diagnostics. The computer readable medium includes a vehicle decoder configured to determine vehicle characteristic information based on vehicle identification information received by the smart phone, wherein the vehicle characteristic information including the vehicle year, make and model. The computer readable medium further includes a diagnostic database having diagnostic solutions matched with symptomatic data. The diagnostic database is organized according to vehicle characteristic information. The computer readable medium additionally includes a display module configured to display a symptomatic question sequence for the user. The symptomatic question sequence is associated with the vehicle characteristic information. The diagnostic database is configured to match symptomatic data received from the smart phone with a diagnostic solution corresponding to the vehicle characteristic information of the vehicle.

According to yet another aspect of the present invention, there is provided a method of diagnosing a vehicle using a smart phone. The method includes receiving vehicle identification information from a smart phone and determining vehicle characteristic information from the vehicle identification information. The method further includes displaying a symptomatic question sequence on the smart phone and receiving symptomatic data from the user, wherein the symptomatic data corresponds to the symptomatic questions sequence. The method additionally includes communicating the symptomatic data to a diagnostic database having diagnostic solutions matched with symptomatic data, wherein the diagnostic database is organized according to vehicle characteristic information. The symptomatic data is matched with diagnostic solutions corresponding to vehicle characteristic information of the vehicle.

The receiving vehicle identification information step may include receiving a digital file from the smart phone, wherein the digital file corresponds to a photograph including vehicle identification information. The receiving vehicle identification information step may include receiving information related to the vehicle identification number or the license plate of the vehicle.

The displaying step may include displaying a first question and a second question, wherein the content of the second question depends on user input received in relation to the first question.

The method may further comprise the steps of communicating the diagnostic solution from the diagnostic database to the smart phone, and displaying the diagnostic solution on the smart phone.

The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein.

Common reference numerals are used throughout the drawings and detailed description to indicate like elements.

DETAILED DESCRIPTION OF THE INVENTION

Figure 1:
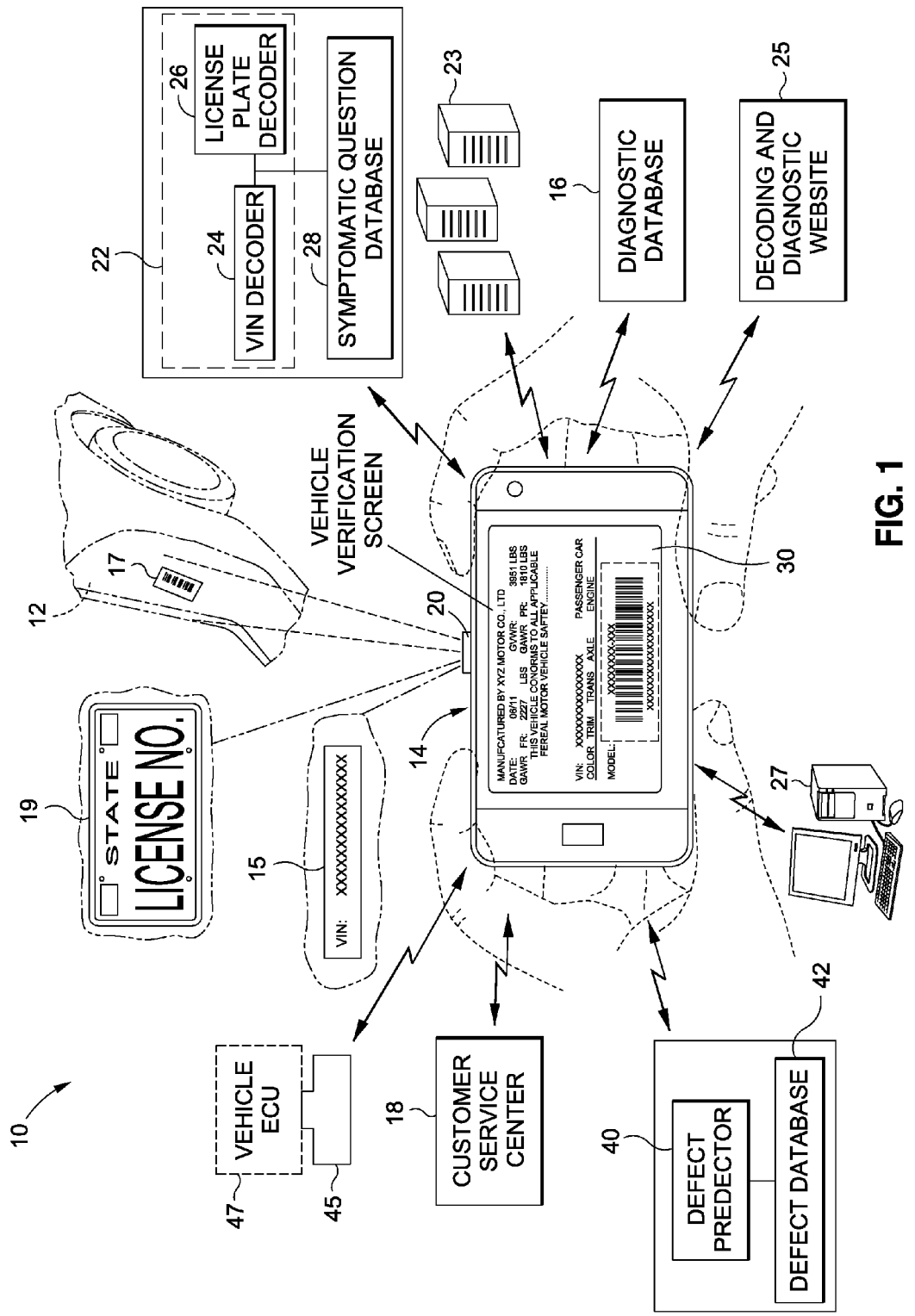
FIG. 1 is a schematic overview of an embodiment of a smart phone based vehicle verification and predictive diagnostic system.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for purposes of illustrating a preferred embodiment of the present invention only, and are not for purposes of limiting the same, there is shown a symptomatic diagnostic system 10 for diagnosing a vehicle 12 using vehicle identification information, such as the vehicle identification number (VIN) or license plate information, to generate vehicle specific symptomatic questions for display on the user's smart phone 14. The symptomatic question sequence may vary from vehicle to vehicle, and may be developed based on historical diagnostic records for similar vehicles. In this regard, the symptomatic questions sequence is "intelligent" insofar as the questions may be vehicle-specific and may be based on continually-updated historical diagnostic records. The symptomatic questions may be displayed on the smart phone 14 and the user may enter the answers to the symptomatic questions into the smart phone, which may upload the answers to a remote diagnostic database 16 or a customer service center 18. The user's answers may be used to determine a probable diagnosis and to identify a most likely fix to the probable diagnosis.

The smart phone based system 10 provides vehicle specific diagnostic support in isolated and remote locations. For instance, if a user is experiencing vehicle problems while on a long road trip, the user may utilize the system 10 to obtain advanced diagnostic support without having to visit a mechanic's garage or repair shop. In this regard, the advanced diagnostic support may be accessible wherever the user's smart phone can communicate with the remote diagnostic database 16 and/or customer service center 18. Moreover, if the user does visit a mechanic, the user may be armed with the objective assessment obtained from the diagnostic system 10 to keep the mechanic honest.

Referring now specifically to FIG. 1, there is shown an embodiment of the vehicle-specific symptomatic diagnostic system 10 which utilizes the smart phone 14 as a central hub of information. As used herein, the term "smart phone" may refer to a handheld electronic device having an input, a display and the capability of communicating over a wireless communication network. Exemplary smart phones include the Apple iPhone®, the RIM Blackberry®, and the Galaxy Nexus®. It is also contemplated that the term "smart phone" may encompass tablet computers, such as the Apple iPad® or the Microsoft Surface®, or other handheld electronic devices known by those skilled in the art.

The smart phone 14 is used to optically capture vehicle identification information associated with the vehicle 12. Those skilled in the art will readily appreciate that most smart phones 14 include a camera 20. The camera 20 is used to capture an image of vehicle identification information associated with the vehicle, such as the VIN 15 or license plate 19. The VIN may be displayed in various locations throughout the vehicle, such as under the windshield or in the door panel. It is also contemplated that the VIN may be associated with a bar code 17 attached to the vehicle. The camera 20 may capture an image of the bar code 17 or scan the bar code 17 to decode the bar code 17 to obtain the VIN.

It is also contemplated that in other embodiments, the vehicle identification information may be manually entered into the smart phone 14. In yet another embodiment, the smart phone 14 may be disposable in wireless communication with an onboard vehicle computer to receive vehicle information therefrom. For instance, the onboard vehicle computer may emit a wireless signal including the electronic VIN associated with the vehicle 12.

After the vehicle identification information is obtained by the smart phone 14, the vehicle identification information is uploaded to a vehicle decoder 22 to determine vehicle characteristic information based on the vehicle identification information. The vehicle characteristic information may include, but is not limited to the vehicle year, make, model, and engine type.

According to one embodiment, the vehicle decoder 22 is located remotely from smart phone 14 such that the image of the vehicle identification information is communicated from the smart phone 14 to the remote vehicle decoder 22 via wireless communication means, such as via a cellular telephone network. For instance, the remote vehicle decoder 22 may be located on a server 23, a personal computer 27, or other remote computing devices. In another embodiment, the vehicle decoder 22 is stored locally on the smart phone 14, in which case, the vehicle identification information may be communicated from the camera 20 to the vehicle decoder 22 within the smart phone 14. The vehicle decoder 22 may extract or determine information based on a photograph of the vehicle's VIN 15 or license plate 19. For instance, the vehicle decoder 22 may identify the specific alphanumeric characters included in the image of the VIN 15 or license plate, which in turn may be used to determine the vehicle characteristic information.

In one embodiment, the vehicle decoder 22 is a VIN decoder 24 which derives vehicle characteristic information from the vehicle's VIN. In this regard, the various alphanumeric characters included in the VIN may be used to determine the vehicle characteristic information. The VIN decoder 24 may include a VIN decoding database or lookup table which vehicle characteristic information correlated to alphanumeric characters included in the VIN. In another embodiment, the vehicle decoder 22 is a license plate decoder 26 and derives the vehicle characteristic information from the license plate. In this regard, the license plate decoder 26 may have access to one or more government databases having stored vehicle characteristic information correlated with license plate information.

Once the vehicle characteristic information is determined by the vehicle decoder 22, a signal including the vehicle characteristic information is sent to the symptomatic question database 28. The symptomatic question database 28 includes symptomatic questions organized according to vehicle characteristic data. For instance, the symptomatic questions for a 2008 HONDA ACCORD® may differ from the symptomatic questions for a 2008 TOYOTA CAMERY®. Thus, the symptomatic questions may be vehicle specific, depending on the year, make, model, engine type or other vehicle characteristic.

As used herein, "symptomatic questions" are questions which may be presented to the user to diagnose a potential vehicle problem based on a user's characterization of vehicle symptoms or defects. The symptomatic question sequence may include a comprehensive, multi-level series of questions which become more specific based on the user's answers. In this regard, the symptomatic questions may be presented to the user to trouble-shoot the vehicle problems based on questions answered by the user.

The symptomatic question sequence may begin with simple, closed-ended questions presented in a multiple choice format. For instance, a general question which may be initially asked to the user may be: "What appears to be the nature of the problem? A) Mechanical or B) Electrical." If the user selects "A) Mechanical," a series of follow up questions may include, "What type of symptom(s) are you experiencing? A) Irregular Smell, B) Irregular Sound, C) Irregular Sight (i.e., smoke), D) Irregular Feel (i.e., vibration)." "Where is the irregular sound coming from? A) Front—Driver's Side, B) Front—Passenger's Side, C) Rear—Driver's Side, D) Rear—Passenger's Side." "When do you hear the sound? A) When the car is in park, B) When the car is moving." "Does the sound occur when you press the brakes? A) Yes, B) No." Those skilled in the art will readily appreciate that the questions presented above are exemplary in nature only and are not intended to limit the scope of the present invention.

The answers selected by the user may be stored in the smart phone 12 and then uploaded to the remote diagnostic center 20. The answers may be matched with databases at the remote diagnostic center 20 and/or may be reviewed by diagnostic personnel, i.e., mechanics, to determine a possible diagnostic solution.

The symptomatic questions may be derived from historical information related to vehicle fixes for vehicle sharing similar vehicle characteristic information. In particular, the content of the symptomatic questions and the order of the symptomatic questions may be arranged based on historical data. According to a preferred implementation of the present invention, the symptomatic questions are updated in the database 28 by a network of mechanics or automotive professionals based on their experience in diagnosing vehicles having certain vehicle characteristics.

Figure 2:
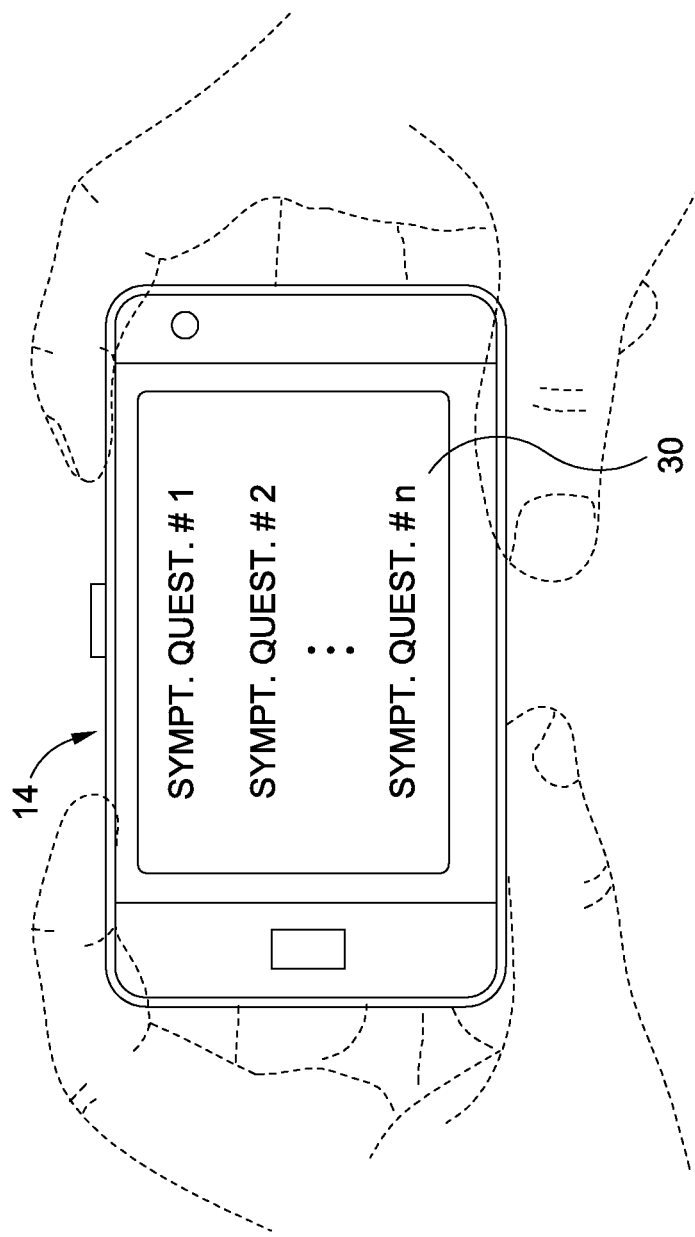
FIG. 2 is a schematic view of a smart phone listing a series of symptomatic questions.

The symptomatic question(s) are communicated from the symptomatic question database 28 to the smart phone 14 for display on the smart phone display 30 (see FIG. 2). In one embodiment, the questions are downloaded onto the smart phone 14 for display on the smart phone 14, while in another embodiment, the questions are hosted on a website accessible by the smart phone 14.

The symptomatic questions sequence may be static, i.e., wherein the content and sequence of questions are generated irrespective of the user's answers, or dynamic, i.e., wherein the content and/or sequence of questions are generated in response to the user's answers. In other words, the symptomatic question sequence may include at least a first question and a second question, wherein the content of the second question depends on user input received in relation to the first question.

According to one embodiment, the symptomatic question database 28 is located remote from the smart phone 14. It is contemplated that the symptomatic question database 28 may store vast amounts of data and require routine updating, and thus, it may be beneficial to have the symptomatic question database 28 located remote from the smart phone 14, which may not have the internal capacity to store such large amounts of data. For instance, the symptomatic question database 28 may be located on the server 23, personal computer 27, or other remote computing devices. However, it is contemplated that other embodiments may include a symptomatic question database 28, or at least a portion thereof, that is stored locally within the smart phone 14. Along these lines, once the vehicle characteristic information is determined, information from the symptomatic question database 28 corresponding to the vehicle characteristic information may be downloaded to the smart phone 14.

The symptomatic questions are displayed on the smart phone display 30 and the user answers the questions using the smart phone input device(s). In this regard, the user's answers may be entered via a touch screen or keypad. It is also contemplated that the smart phone 14 may be configured to detect verbal answers from the user. The user's answers to the symptomatic questions will be referred to herein as "symptomatic data."

The symptomatic data received by the user is communicated to the diagnostic database 16, which includes diagnostic solutions matched with symptomatic data. The diagnostic database is organized according to vehicle characteristic information. In this regard, the diagnostic database matches the symptomatic data received from the smart phone 14 with a diagnostic solution corresponding to the vehicle characteristic information of the vehicle under consideration. The diagnostic database 16 may be located remotely from the smart phone 14, such as on the server 23, the personal computer 27, or other remote computing devices. Alternatively, the diagnostic database 16 may be located on the smart phone 14.

Figure 3:
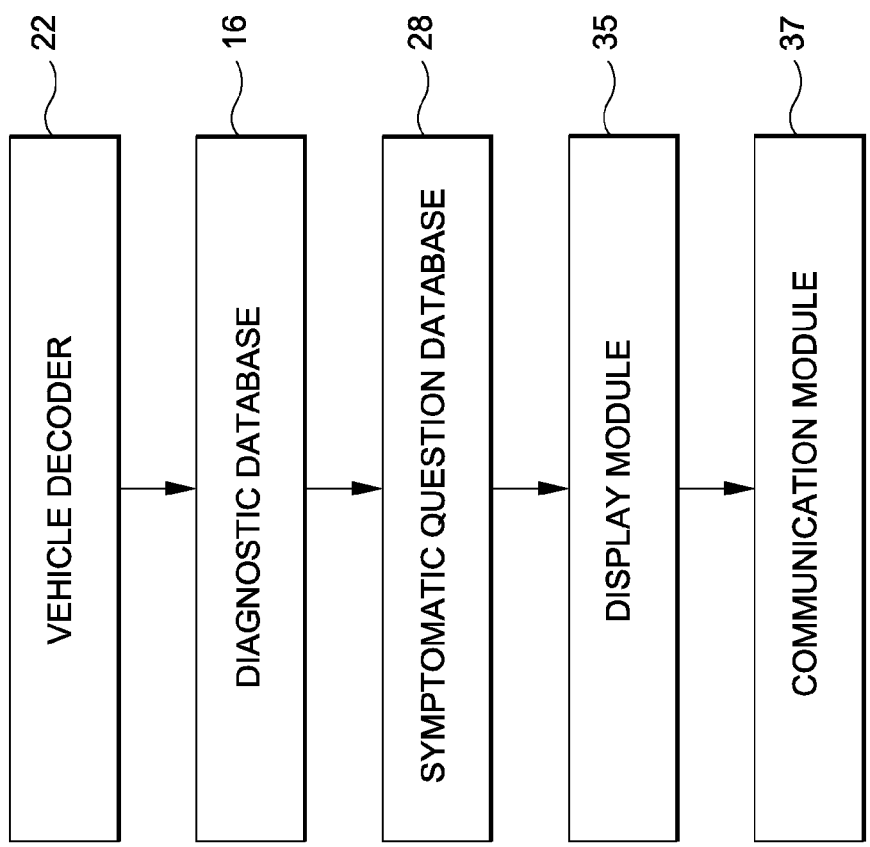
FIG. 3 is a schematic view of an embodiment of a symptomatic diagnostic smart phone application for use with a smart phone.

According to one embodiment, the functions executed by the smart phone 14 may be implemented by a computer readable medium (i.e., a smart phone application or app.) which is downloadable onto the smart phone 14. Referring now specifically to FIG. 3, there is shown a schematic view of an embodiment of the smart phone app. which is downloadable onto the smart phone 14. In the exemplary embodiment, the smart phone app. includes the vehicle decoder 22, diagnostic database 16, symptomatic question database 28, a display module 35, and a communications module 37. Those skilled in the art will readily appreciate that the smart phone app. shown in FIG. 3 is exemplary in nature only and that not all embodiments of the smart phone app. may include all of the components depicted in FIG. 3. Furthermore, additional components may be added to the smart phone app. without departing from the spirit and scope of the present invention.

It is also contemplated that the computer readable medium may configure the smart phone 14 to perform other functions. For instance, the smart phone may be able to extract/determine vehicle identification information from a photograph of the VIN or license plate. The determined vehicle identification information may be used by the vehicle decoder 22 to derive the vehicle characteristic information.

The smart phone app. may further configure the smart phone 14 to receive the diagnostic solution from the diagnostic database 16 and display the diagnostic solution on the smart phone display 30. Once the diagnostic solution is displayed, the user may take appropriate action to either implement the diagnostic solution or seek help from a mechanic.

It is contemplated that the various aspects of the present invention are related to determining a diagnostic solution based solely on the symptomatic data provided by the user. However, other aspects of the invention relate to utilizing data retrieved from the vehicle, along with the symptomatic data, to determine the diagnostic solution. In this regard, the vehicle data may be used to verify a diagnostic solution derived solely from symptomatic data, or the vehicle data may be used in conjunction with the symptomatic data to determine the best or most likely diagnostic solution from a list of possible diagnostic solutions.

Accordingly, in one embodiment, the smart phone app. configures the smart phone 14 to receive vehicle diagnostic data and upload the vehicle diagnostic data to the diagnostic database 16. The vehicle diagnostic data may be communicated from a code reader 45, which communicates with the vehicle ECU 47. The code reader 45 may have the communication capabilities to poll the vehicle ECU 47 to determine the proper communication protocols for retrieving information from the ECU 47. The code reader 45 may also have storage capabilities to store the protocol information, as well as diagnostic data retrieved from the vehicle. Vehicle data retrieved by the code reader 45 may be communicated to the smart phone 14, preferably by wireless communication. In this regard, the code reader 45 may have a built-in wireless communication circuit, or alternatively, the code reader 45 may be configured to be connectable with a wireless communication adapter for wirelessly communicating vehicle data to the smart phone 14. It is also contemplated that the code reader 45 may be configured to communicate the vehicle data retrieved from the ECU 47 via wired communication means. Although the code reader 45 is configured to communicate information to the smart phone 14, various embodiments of the code reader 45 are configured to operate independent of the smart phone 14. In this regard, the code reader 45 may poll the ECU 47, retrieve diagnostic data from the ECU 47 and store the data independent of the smart phone 14.

Certain embodiments of the code reader 45 may be more sophisticated and include a user interface including a local display for displaying diagnostic data (i.e., diagnostic trouble codes, freeze frame data, live data, etc.) retrieved from the vehicle. The user interface may also include a user input(s) for allowing a user to make selections or navigate through information. In another embodiment, the code reader 45 is less sophisticated and does not include a user interface, and simply includes the capability to interface the smart phone 14 with the vehicle ECU 47. In this regard, a less sophisticated code reader 45 would have the capability to communicate with the ECU 47, store vehicle data, and upload that data to the smart phone 14.

Any information retrieved by the code reader 45 communicated to the smart phone 14 may be uploaded to the diagnostic database 16, which may be configured to receive the diagnostic data and make a diagnostic determination based on the vehicle diagnostic data and the symptomatic data.

The code reader 45 may also be able to retrieve an electronic VIN from the vehicle ECU 47, wherein the electronic VIN may be used to determine the vehicle characteristic information, as described in more detail above.

Although one feature of the present invention is to determine a diagnostic solution based, at least in part, on symptomatic data, one step in the diagnostic process is to determine vehicle characteristic information. It is contemplated that once the vehicle characteristic information is determined, additional information which may be useful to the user may be easily obtained. For instance, in one embodiment, the vehicle characteristic information may be used to make a diagnostic prediction of the vehicle. More specifically, the diagnostic predication may include a summary of likely failures or repairs for the vehicle, and the mileage at which those failures or repairs will likely occur. Thus, the predictive diagnostic feature may provide the user with an estimate as to the health of the vehicle and the cost for operating and maintaining the vehicle in the future. For a more comprehensive discussion on predictive diagnostics, please refer to U.S. patent application Ser. No. 13/589,532, entitled Predictive Diagnostic Calculation, owned by Innova Electronics Inc. of Irvine, Calif., and the contents of which are expressly incorporated herein by reference.

The diagnostic prediction feature includes a defect predictor 40 which compares the vehicle characteristic data (i.e., the determined year, make, model, etc.) associated with the vehicle with information in a historical defect database 42 to make the diagnostic prediction. The diagnostic prediction may be summarized as being a LOW, MEDIUM or HIGH probability of failure, and may relate to the vehicle as a whole, or a particular component, within a certain mileage range.

The defect database 42 includes information related to defects that have occurred in different vehicles and the reference mileage at which such defects occurred. The defector predictor 40 is in communication with the vehicle decoder 22 and the defect database 42 and is configured to identify defects listed in the defect database 42 corresponding to vehicles having similar characteristic information to the vehicle.

According to one embodiment, the defect database 42 includes the reference mileage associated with each identified associated defect. In this regard, the smart phone app may further configures the smart phone to prompt the user to enter the mileage of the vehicle and communicate the entered mileage to the defect predictor 40. The defect predictor 40 may be further configured to restrict the identified defects to defects that have occurred within a mileage bracket that substantially corresponds to the current mileage of the vehicle.

For more information related to defect prediction, please see U.S. patent application Ser. No. 13/569,522 entitled Smart Phone App-Based Method and System of Collecting Information for Purchasing Used Cars, filed Aug. 8, 2012 and owned by Innova Electronics Inc. of Irvine, Calif., and whose contents are expressly incorporated herein by reference.

Although the foregoing describes many of the functionalities of the symptomatic diagnostic system as being implemented on a smart phone app., it is also contemplated that the functionalities may be hosted by a website 25 accessible by the smart phone 14 or any other computing device. In this regard, the website 25 may host the vehicle decoder 22, the diagnostic database 16, and the symptomatic question database 28. Information may be communicated between the website 25 and the smart phone 14 via a cellular telephone network. Information received by the smart phone 14 from the website 25, such as the symptomatic questions, may be displayed on the smart phone 14. Furthermore, information received by the website 25 from the smart phone 14 may be analyzed and processed by the servers or databases hosting the website 25.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. A system for providing vehicle specific diagnostics for a vehicle using a smart phone, the system comprising:
  a vehicle decoder disposable in communication with the smart phone and configured to determine vehicle characteristic information based on vehicle identification information received from the smart phone, the vehicle characteristic information including the vehicle year, make and model;
  a diagnostic database having diagnostic solutions matched with symptomatic data, the diagnostic database being organized according to vehicle characteristic information; and
  a non-transitory computer readable medium downloadable onto the smart phone for configuring the smart phone to:
    display a symptomatic question sequence for the user;
    store symptomatic data received from the user; and
    communicate the symptomatic data to the diagnostic database;
  the diagnostic database being configured to match symptomatic data received from the smart phone with a diagnostic solution corresponding to the vehicle characteristic information of the vehicle; and
  wherein at least one of the vehicle decoder and the computer readable medium is configured to extract the vehicle identification information from a photograph of a vehicle identification number (VIN) received from the smart phone.

2. The system recited in claim 1, wherein the vehicle decoder is located on the smart phone.

3. The system recited in claim 1, wherein the vehicle decoder is located remotely from the smart phone.

4. The system recited in claim 3, further comprising a computer server, the vehicle decoder being located on the computer server.

5. The system recited in claim 3, further comprising a personal computer, the vehicle decoder being located on the personal computer.

6. The system recited in claim 1, wherein the diagnostic database is located on the smart phone.

7. The system recited in claim 1, wherein the diagnostic database is located remotely from the smart phone.

8. The system recited in claim 7, further comprising a computer server, the diagnostic database being located on the computer server.

9. The system recited in claim 7, further comprising a personal computer, the diagnostic database being located on the personal computer.

10. The system recited in claim 1 wherein the vehicle characteristic information further includes engine type.

11. The system recited in claim 1 wherein the symptomatic question sequence includes a first question and a second question, the content of the second question depending on user input received in relation to the first question.

12. The system recited in claim 1, wherein the computer readable medium further configures the smart phone to:
  receive information associated with the diagnostic solution from the diagnostic database; and
  display the information associated with the diagnostic solution.

13. The system recited in claim 12, wherein the information associated with the diagnostic solution includes the cost of repair.

14. The system recited in claim 1, wherein:
  the computer readable medium further configures the smart phone to:
    receive vehicle diagnostic data; and
    upload the vehicle diagnostic data to the diagnostic database; and
  the diagnostic database is configured to receive the diagnostic data and make a diagnostic determination based on the vehicle diagnostic data and the symptomatic data.

15. The system recited in claim 14, further comprising a code reader configured to receive diagnostic data from the vehicle, the code reader being disposable in communication with the smart phone to communicate diagnostic data thereto.

16. The system recited in claim 1, further comprising:
  a defect database having information related to defects that have occurred in different vehicles and a reference mileage at which such defects occurred; and
  a defect predictor in communication with the vehicle decoder and the defect database and configured to identify defects listed in the defect database corresponding to vehicles having characteristic information similar to that of the vehicle.

17. The system recited in claim 16, wherein the defect database includes the reference mileage associated with each identified associated defect.

18. The system recited in claim 17, wherein the computer readable medium further configures the smart phone to prompt the user to enter the current mileage of the vehicle and to communicate the entered mileage to the defect predictor.

19. The system recited in claim 18, wherein the defect predictor is further configured to restrict the identified defects to defects that have occurred within a mileage bracket that substantially corresponds to the current mileage communicated to the defect predictor.

20. A method of diagnosing a vehicle using a smart phone, the method comprising the steps of:
  receiving vehicle identification information from a smart phone;
  determining vehicle characteristic information from the vehicle identification information, the vehicle characteristic information including year, make, and model of the vehicle;
  generating a symptomatic question sequence associated with the vehicle characteristic information;
  receiving symptomatic data from the user, wherein the symptomatic data corresponds to the symptomatic questions sequence;
  communicating the symptomatic data to a diagnostic database having diagnostic solutions matched with symptomatic data, the diagnostic database being organized according to vehicle characteristic information;
  matching the symptomatic data with diagnostic solutions corresponding to vehicle characteristic information of the vehicle; and
  wherein the step of receiving vehicle identification information includes receiving a digital file from the smart phone, the digital file corresponding to a photograph including the vehicle identification information.

21. The method recited in claim 20, wherein the step of receiving vehicle identification information includes receiving a photograph of a vehicle identification number.

22. The method recited in claim 20, wherein the step of receiving vehicle identification information includes receiving a photograph of a license plate of the vehicle.

23. The method recited in claim 20, wherein the displaying step includes displaying a first question and a second question, the content of the second question depending on user input received in relation to the first question.

24. The method recited in claim 20, further comprising the steps of:
  communicating the diagnostic solution from the diagnostic database to the smart phone; and
  displaying the diagnostic solution on the smart phone.

25. A system for providing vehicle specific diagnostics for a vehicle using a smart phone, the system comprising:
  a vehicle decoder disposable in communication with the smart phone and configured to determine vehicle characteristic information based on vehicle identification information received from the smart phone, the vehicle characteristic information including the vehicle year, make and model;
  a diagnostic database having diagnostic solutions matched with symptomatic data, the diagnostic database being organized according to vehicle characteristic information; and
  a non-transitory computer readable medium downloadable onto the smart phone for configuring the smart phone to:
    display a symptomatic question sequence for the user;
    store symptomatic data received from the user; and
    communicate the symptomatic data to the diagnostic database;
  the diagnostic database being configured to match symptomatic data received from the smart phone with a diagnostic solution corresponding to the vehicle characteristic information of the vehicle; and
  wherein the vehicle decoder is configured to extract the vehicle identification information from a photograph of a vehicle license plate received from the smart phone.

26. The system recited in claim 25, wherein the vehicle decoder is located on the smart phone.

27. The system recited in claim 25, wherein the vehicle decoder is located remotely from the smart phone.

28. The system recited in claim 27, further comprising a computer server, the vehicle decoder being located on the computer server.

29. The system recited in claim 27, further comprising a personal computer, the vehicle decoder being located on the personal computer.

30. The system recited in claim 25, wherein the diagnostic database is located on the smart phone.

31. The system recited in claim 25, wherein the diagnostic database is located remotely from the smart phone.

32. The system recited in claim 31, further comprising a computer server, the diagnostic database being located on the computer server.

33. The system recited in claim 31, further comprising a personal computer, the diagnostic database being located on the personal computer.

34. The system recited in claim 25, wherein the vehicle identification information includes a vehicle identification number.

35. The system recited in claim 25 wherein the vehicle characteristic information further includes an engine type.

36. The system recited in claim 25 wherein the symptomatic question sequence includes a first question and a second question, the content of the second question depending on user input received in relation to the first question.

37. The system recited in claim 25, wherein the computer readable medium further configures the smart phone to:
receive information associated with the diagnostic solution from the diagnostic database; and
display the information associated with the diagnostic solution.

38. The system recited in claim 37, wherein the information associated with the diagnostic solution includes a cost of repair.

39. The system recited in claim 25, wherein:
the computer readable medium further configures the smart phone to:
receive vehicle diagnostic data; and
upload the vehicle diagnostic data to the diagnostic database; and
the diagnostic database is configured to receive the diagnostic data and make a diagnostic determination based on the vehicle diagnostic data and the symptomatic data.

40. The system recited in claim 25, further comprising:
a defect database having information related to defects that have occurred in different vehicles and a reference mileage at which such defects occurred; and
a defect predictor in communication with the vehicle decoder and the defect database and configured to identify defects listed in the defect database corresponding to vehicles having characteristic information similar to that of the vehicle.

41. The system recited in claim 40, wherein the defect database includes the reference mileage associated with each identified associated defect.

42. The system recited in claim 39, wherein the computer readable medium further configures the smart phone to prompt the user to enter the current mileage of the vehicle and to communicate the entered mileage to the defect predictor.

43. The system recited in claim 40, wherein the defect predictor is further configured to restrict the identified defects to defects that have occurred within a mileage bracket that substantially corresponds to the current mileage communicated to the defect predictor.

44. A system for providing vehicle specific diagnostics for a vehicle using a smart phone, the system comprising:
a vehicle decoder disposable in communication with the smart phone and configured to determine vehicle characteristic information based on vehicle identification information received from the smart phone, the vehicle characteristic information including the vehicle year, make and model;
a diagnostic database having diagnostic solutions matched with symptomatic data, the diagnostic database being organized according to vehicle characteristic information; and
a non-transitory computer readable medium downloadable onto the smart phone for configuring the smart phone to:
display a symptomatic question sequence for the user;
store symptomatic data received from the user; and
communicate the symptomatic data to the diagnostic database;
the diagnostic database being configured to match symptomatic data received from the smart phone with a diagnostic solution corresponding to the vehicle characteristic information of the vehicle;
a defect database having information related to defects that have occurred in different vehicles and a reference mileage at which such defects occurred;
a defect predictor in communication with the vehicle decoder and the defect database and configured to identify defects listed in the defect database corresponding to vehicles having characteristic information similar to that of the vehicle;
a defect database includes the reference mileage associated with each identified associated defect; and
wherein the computer readable medium further configures the smart phone to prompt the user to enter the current mileage of the vehicle and to communicate the entered mileage to the defect predictor.

45. The system recited in claim 44, wherein the defect predictor is further configured to restrict the identified defects to defects that have occurred within a mileage bracket that substantially corresponds to the current mileage communicated to the defect predictor.

* * * * *